United States Patent [19]
Tamai et al.

[11] Patent Number: 5,760,529
[45] Date of Patent: Jun. 2, 1998

[54] VIBRATION WAVE ACTUATOR AND SYSTEM USING THE SAME

[75] Inventors: Jun Tamai; Ichiro Okumura, both of Yokohama; Kazuki Fujimoto, Kawasaki, all of Japan

[73] Assignee: Canon Kabushiki Kaisha, Tokyo, Japan

[21] Appl. No.: 636,497

[22] Filed: Apr. 23, 1996

[30] Foreign Application Priority Data

| Apr. 24, 1995 | [JP] | Japan | 7-098520 |
| Apr. 24, 1995 | [JP] | Japan | 7-098521 |

[51] Int. Cl.⁶ ............................................ H02N 2/00
[52] U.S. Cl. ............................................. 310/323
[58] Field of Search ........................................ 310/323

[56] References Cited

U.S. PATENT DOCUMENTS

| 4,015,931 | 4/1977 | Thakur | 125/12 |
| 4,309,680 | 1/1982 | Suzuki | 333/197 |
| 4,580,073 | 4/1986 | Okumura et al. | 310/323 |
| 4,587,452 | 5/1986 | Okumura et al. | 310/328 |
| 4,678,956 | 7/1987 | Izukawa et al. | 310/323 |
| 4,692,650 | 9/1987 | Okumura et al. | 310/323 |
| 4,692,651 | 9/1987 | Hiramatsu et al. | 310/323 |
| 4,734,610 | 3/1988 | Okumura et al. | 310/323 |
| 4,752,711 | 6/1988 | Tsukimoto et al. | 310/323 |
| 4,763,148 | 8/1988 | Tsukimoto et al. | 354/195.1 |
| 4,771,203 | 9/1988 | Mukohjima et al. | 310/323 |
| 4,788,468 | 11/1988 | Izukawa et al. | 310/323 |
| 4,944,663 | 7/1990 | Iizuka et al. | 418/178 |
| 5,017,823 | 5/1991 | Okumura | 310/323 |
| 5,099,166 | 3/1992 | Hirano et al. | 310/323 |
| 5,122,700 | 6/1992 | Tamai et al. | 310/323 |
| 5,230,924 | 7/1993 | Li | 427/229 |
| 5,300,850 | 4/1994 | Okumura et al. | 310/323 |
| 5,329,201 | 7/1994 | Shirasaki | 310/323 |
| 5,352,950 | 10/1994 | Shirasaki | 310/323 |
| 5,410,204 | 4/1995 | Imabayashi et al. | 310/323 |
| 5,506,462 | 4/1996 | Tamai et al. | 310/328 |
| 5,554,905 | 9/1996 | Gschwind et al. | 310/323 |
| 5,557,157 | 9/1996 | Shirasaki | 310/323 |

FOREIGN PATENT DOCUMENTS 2-17876  1/1990  Japan .

OTHER PUBLICATIONS

Endo, "Hyomen Kogaku (Surface Engineering)" Ver. 4, p. 63. Jun. 20, 1987.

*Primary Examiner*—Thomas M. Dougherty
*Attorney, Agent, or Firm*—Fitzpatrick, Cella, Harper & Scinto

[57] ABSTRACT

A vibration wave actuator having a vibrating member for generating a vibration wave therein and a contact member contacting the vibrating member so as to be movable relative to the vibrating member by a friction force caused by the vibration wave, as well as to a system using the actuator. Contact portions of the vibrating member and the contact member are made of iron or iron alloy.

48 Claims, 3 Drawing Sheets

F I G. I

VIBRATION WAVE ACTUATOR AND SYSTEM USING THE SAME

BACKGROUND OF THE INVENTION

1. Field of the Invention

The present invention relates to a vibration wave actuator which produces actuating force derived from a vibration wave generated by a vibrating member.

2. Description of the Related Art

Hitherto, friction materials for use as materials of friction members of an ultrasonic wave motor, such as a vibration wave actuator, are proposed in, for example, Japanese Unexamined Patent Publication No. 2-17876. In these proposals, stainless steels and carbon steels are recommended as materials for vibrating members which serve as stators of ultrasonic wave motors, based on consideration of both the vibrating and frictional characteristics of the vibrating members. It is said that these materials enhance the mechanical Q factor of the vibrating member, while improving wear resisting performance of the same.

In general, an ultrasonic motor employs a pair of friction members, i.e., a vibrating member and a contact or movable member, which are constantly held in contact with each other so that the movable member is actuated by friction as a result of vibration of the vibrating member. The foregoing conventional proposal is focused only on the materials of the vibrating friction member and, hence, is unsatisfactory in that it does not take into account the material of the movable friction member.

It has been established for a long time that discussion on characteristics of one of two friction members has to take into consideration also the nature of the mating member, i.e., the other friction member.

For instance, SURFACE ENGINEERING by Yoshiro Endo, 1st version published in 1976 from Yokendo, pp 63 teaches that "vibration characteristics vary depending on the material of the mating member". The inventors have conducted an experiment to confirm this fact by using ultrasonic wave motors, finding that the amount of wear, manner of wear and friction coefficient significantly vary according to the material of the mating member. This fact apparently applies not only to the material of the vibrating friction member but also to the material of the movable friction member which is the mating contact member. Life of an ultrasonic motor expires when the movable friction member has been completely exhausted by wear, even if the vibrating friction member is still alive. It is therefore necessary to consider both the vibrating and moving friction members, rather than either one of them alone, when discussing which materials to use in ultrasonic wave motors.

SUMMARY OF THE INVENTION

Accordingly, an object of the present invention is to provide a vibration wave actuator having improved wear-resistant characteristics.

To this end, the present invention in one aspect provides a vibration wave actuator having a vibrating member and a movable contact member which contact each other, wherein the contact portions of the vibrating member and the movable contact member are formed of iron or an iron alloy so as to improve wear-resistant properties of these members.

The above and other objects, features and advantages of the present invention will become clear from the following description of the preferred embodiments when the same is read in conjunction with the accompanying drawings.

DESCRIPTION OF THE PREFERRED EMBODIMENTS

Figure 1:
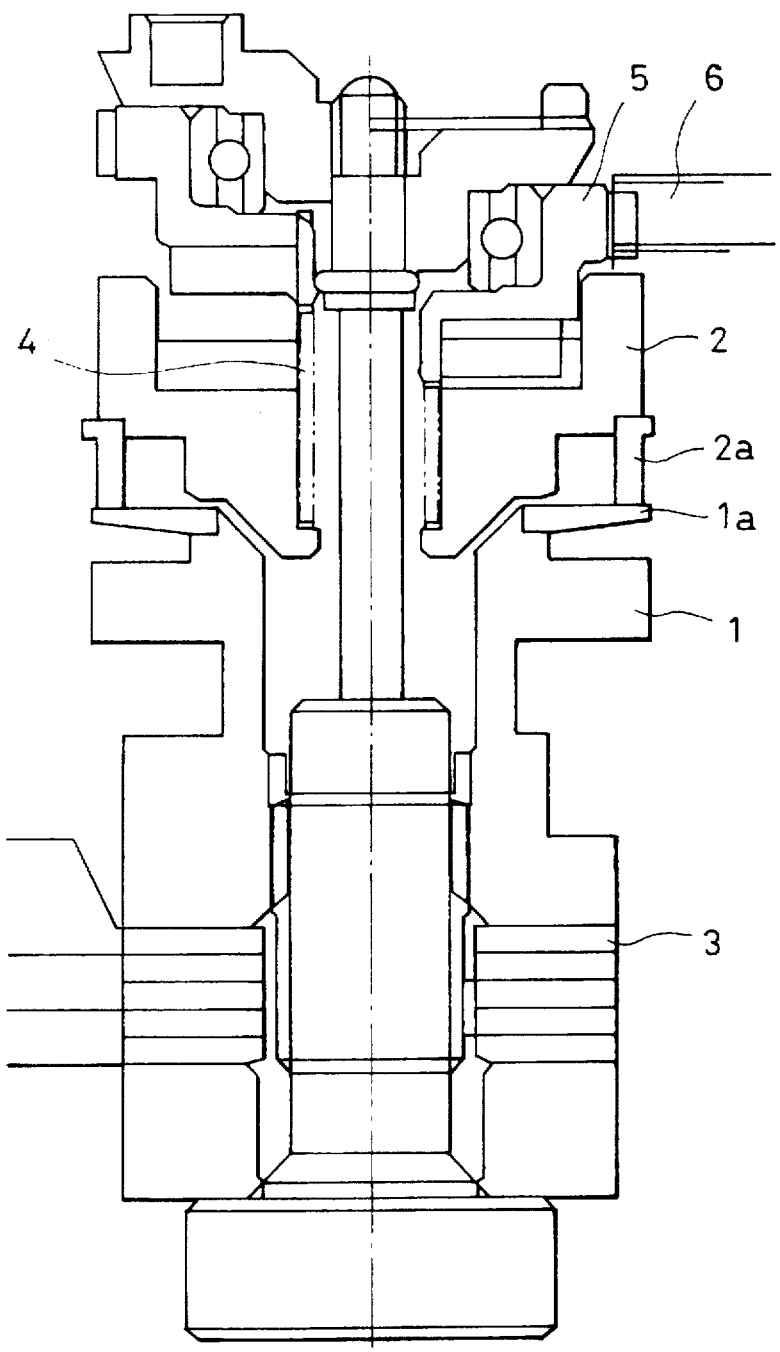
FIG. 1 is a sectional view of an ultrasonic wave motor as a first embodiment of the present invention.

Broadly, there are two forms of wear of friction materials. In one of these two forms of wear known as "severe wear", wear powder is generated as a result of internal shear of the friction material. In this type of wear, the size of the wear powder particles is comparatively large and so is the amount of wear. The other form of wear is so-called "mild wear" in which friction occurs on an extremely thin oxide film formed on the surface of the friction member, and wear powder is generated from the oxide alone. The size of the wear powder particles is therefore very small, and the amount of wear of the friction material also is extremely small as compared with that in severe wear.

The embodiments which will now be described employ, as the material of the friction members, iron or iron alloy which exhibit a large tendency for forming oxide films on the surfaces of friction members formed of such iron or iron alloy, so that friction between the friction members takes place under such a condition that causes mild wear. In general, the oxide film formed on iron or iron alloy is $Fe_2O_3$ or $Fe_3O_4$, but $Fe_3O_4$ is formed principally when the material temperature is raised to 250° C. or so. The thickness of this type of film increases in accordance with a further rise in the temperature of the material.

When the material is a stainless steel, the oxide film has the form of a chromium oxide film which, as is the case of $Fe_3O_4$, is referred to as a "passive film". The passive film has a fine structure and is very stable. The internal part of the material is protected by this film from corrosion. Chromium oxide film exhibits a greater protection effect than $Fe_3O_4$ film, so that stainless steel is preferentially used when there is concern about any influence of corrosion, i.e., rusting.

The temperature of the friction interface in an ultrasonic wave motor as a vibration wave actuator may be as high as 300° C. or so, as observed in experiments conducted under light load. This has been confirmed through the fact that friction surfaces of iron or iron alloy, used as the materials of the vibrating friction member and movable (contact) friction member of the ultrasonic wave motor, exhibited blue colors.

This blue color is peculiar to the blue color temperature range which is often discussed in the field of iron and steels, and the tone of the blue color varies according to the thickness of the oxide film.

The thickness of this film grows larger as the temperature of the friction surface rises. In other words, severe condition of use of the friction material causes a change of the nature of the film that increases the effect to protect the core material. It is thus possible to maintain the mild wear condition.

In this specification, steels such as carbon tool steel, carbon steel, structural rolled steel and so forth, as well as pure iron, are inclusively referred to as "iron", while steels and iron containing alloying component other than carbon are inclusively referred to as "iron alloy".

In order to ensure that the wear takes place always in the form of mild wear, the friction members used in the embodiment are formed from iron alloy or alloys which tend to generate an oxide film thereon.

In working out the embodiments which will be described later, the inventors have confirmed that mutual contact between two friction members made of iron or iron alloy takes place only across oxide films formed on these members, so that the amount of wear can be remarkably reduced so as to drastically extend the life of the vibration wave actuator, if iron or iron alloy alone is selected in cooperation with levels of forces applied to the friction members so as to provide resistance to deformation, i.e., hardness large enough to prevent breakage of the oxide films formed on the friction members.

To sum up, it is a first requirement that an oxide film necessary for maintaining the mild wear condition actually exists. The inventors have confirmed through experiments that $Fe_3O_4$ film formed on the surface of an iron or iron alloy member or chromium oxide film generated on the surface of a stainless steel member remarkably reduces the rate of wear, thus achieving the above-described requirement.

It also has been found that $Fe_3O_4$ film is preferably formed by exposing the friction members to a steam homogenizing treatment, although this film can be formed naturally by the effect of heat generated as a result of the friction. The steam homogenizing treatment is a treatment in which a member made of iron or an iron alloy is put into superheated steam of about 500° C. so as to form a film of $Fe_3O_4$ on the surface of the member. Alternatively, a $Fe_3O_4$ film is formed by immersing the member in a solution of sodium hydroxide. The steam homogenizing treatment or the treatment in sodium hydroxide solution provides an $Fe_3O_4$ film covering not only on the portion of the member which makes frictional contact but also on other portions, so that anti-rust effect can be developed over the entire surface of the friction member. From the view point of prevention of rusting, it is an effective measure to form a phosphate film.

Meanwhile, chromium oxide film is naturally formed on the surface of a stainless steel member even when the latter is used in a normal environment, so that no specific treatment is required to form this film.

The second requirement is that the $Fe_3O_4$ film or the chromium oxide film has to be formed on a base material which is rigid enough to prevent the film from being broken by the pressing force or frictional resistance force acting between two friction surfaces Iron and iron alloy also meet this requirement because it is comparatively easy to form rigid members from such materials as compared with other kinds of materials.

First Embodiment

FIG. 1 is a sectional view of an ultrasonic wave motor as a first embodiment of the vibration wave actuator of the invention. Referring to FIG. 1, a friction member 1a as a contacting part is coupled to a vibration member 1, while another friction member 2a as a contacting part is coupled to a movable member 2 which also is referred to as a contact member. In this embodiment, these friction members are formed from bronze or aluminum alloy by cutting or from iron alloy by press work. The friction member 1a associated with the vibration member 1, however, may be formed by etching, while the friction member 2a associated with the movable member 2 may be formed by cutting a pipe.

In the experiments conducted by the inventors, these friction members are coupled to the vibrating member and the movable member, respectively, by press fitting. The coupling, however, may be achieved by bonding, welding or the like.

The principle and other detail of this ultrasonic wave motor are disclosed in the specification of U.S. Pat. No. 5,122,700 and, therefore, are not described in this specification. Numeral 3 denotes an electromechanical energy transducer which, when supplied with an A.C. voltage, generates a progressive wave vibration on the vibrating member 1. A coiled spring 4 serves to keep the movable member 2 in contact with the vibrating member 1. Although in this embodiment the arrangement is such that the movable member 2 rotates relative to the vibrating member 1 which is stationary, the arrangement may be such that the movable vibrating member 1 rotates relative to a stationary contact member 2. Numerals 5 and 6 denote output gears which transmit the rotation to a driven member (not shown). Thus, the vibration member 1, the movable member 2 and the output gears 5, 6 in cooperation provide a vibration wave actuator system.

In accomplishing this embodiment, a plurality of combinations of friction materials realized by using a variety of friction materials were tested for evaluation in ultrasonic wave motors.

Table 1 shows the friction materials, while Tables 2 and 3 show the results of measurements of wear amounts presented by different combinations of these friction members. Table 4 shows the results obtained when the test was conducted under a low contact pressure determined to impose a load torque of 0.01 N·m or so on the ultrasonic wave motor. Table 3 shows the results of measurements of wear amounts observed when the contact pressure was increased to a level 5 times as large the above-mentioned contact pressure, so as to generate a starting torque of about 0.045 N·m, so that the characteristics peculiar to the ultrasonic wave motor are fully exhibited.

The wear amount is show in terms of height or thickness of wear per 10 km of relative movement between the mating friction members. Wear amounts also were measured at 10 km of the relative movement, in order to examine the state of wear in a running-in period. In some cases, the wear observed after the running-in period was so heavy that the life of the combination of the friction members was expected to expire before the distance of the relative movement reaches 10 km on an assumption that the wear would proceed in proportion to the distance of the relative movement. In such cases, the amount of wear per 10 km was determined by multiplying the wear amount at the 0.5 km of relative movement distance with a factor 20 (=10 km/0.5 km), and the combination of friction materials which showed such heavy wear was ranked as being "inferior".

The length of life was determined to expire when either one of the friction members exhibited a thickness reduction of 30 µm which corresponds to the thickness of the plating film or the thickness of alumite film. Combinations which showed thickness reduction around the above-mentioned value were evaluated as being "rather inferior". Combinations of friction materials were evaluated as "excellent" when they showed wear amounts less than 1 µm. It might not be unreasonable to consider that the life of an iron alloy friction member does not expire even when the wear amount exceeds 30 µm, since the iron alloy material constitutes not only the surface region but also the entire portion of the member. In order to provide good basis for comparison, however, the criterion for evaluation of expected life was set to the above-mentioned value of 30 µm.

The wear amount was measured per 10 km of distance of relative movement. This value was employed on an assumption that the ultrasonic wave motor was intended to be used as the actuator of an auto-focus drive of a single-lens reflex camera.

Considering the possible future diversification of use of this type of motor, however, it will become necessary to employ a longer distance of relative movement for the purpose of evaluation of durability.

TABLE 1

| Sample No. | Material | Composition (wt %) | JIS | Processing Method | Treatment | Structure | Surface Hardness (Vickers) | Remarks |
|---|---|---|---|---|---|---|---|---|
| 1 | Nickel-phosphor | Ni89%, P11% | | Non-electrolytic plating | — | Amorphous, Phosphor dissolved | 530 | Base material, free-cutting brass JIS C3604-BH |
| 2 | Nickel-phosphor | Ni89%, P11% | | Non-electrolytic plating | 350° C. 1 hr | Amorphous, Ni-P precipitate | 750 | |
| 3 | Nickel-phosphor | Ni99%, P1% | | Non-electrolytic plating | — | Amorphous, Phosphor dissolved | 640 | |
| 4 | Nickel-phosphor-silicon Carbide | Ni80%, P11%, SiC9% | | Non-electrolytic Composite plating | — | Amorphous, Phosphor dissolved, SiC dispersed | 540 | |
| 5 | Nickel-Boron | Ni99%, B1% | | Non-electrolytic plating | — | Crystalline, Boron dissolved | 820 | |
| 6 | Alumite | | | Anode oxidation 12° C. | — | Columnar, Pore | 390 | Base material, Aluminum Alloy JIS A5056 H34 Alumite film thickness 30 μm |
| 7 | Alumite | | | Anode oxidation 7° C. | — | Columnar, Pore | 440 | Alumite film thickness 15 μm |
| 8 | Iron or Iron alloy Austenitic stainless steel | Cr18%, Ni12%, Mo2% | SUS316 | Rolling | — | Austenite | 170 | |
| 9 | Austenitic stainless steel | Cr18%, Ni12%, Mo2% | SUS316 | Rolling | Nitriding | Nicrided structure | 1000 | Nicrided film thickness 15 μm |
| 10 | Martensitic stainless steel | Cr13%, C0.3% | SUS42OJ2 | Rolling | Quench/Tempering | Martensite + Carbide | 650 | |
| 11 | Martensitic stainless steel | Cr18%, C1.0% | SUS440C | Rolling | Quench/Tempering | Martensite + Carbide | 720 | Carbide grain size 20 μm |
| 12 | Precipitation hardening stainless steel | Cr17%, Ni4%, Cu4%, Nb0.3% | SUS630 | Rolling | Aging | Martensite | 460 | |
| 13 | Precipitation hardening stainless steel | Cr17%, Ni7%, Al1% | SUS631 | Rolling | Aging | Austenite | 570 | |
| 14 | Precipitation hardening stainless steel | Cr15%, Ni7%, Si4%, Mol % | | Rolling | Aging | Austenite | 680 | |
| 15 | Carbon steel | C0.45% | S45C | Rolling | Quench/Tempering | Martensite | 720 | |
| 16 | Carbon tool steel | C1% | SK3 | Rolling | Quench/Tempering | Martensite | 760 | |
| 17 | Alloy tool steel | C1.5%m Cr12%, Mo1%, V0.3% | SKD11 | Rolling | Quench/Tempering | Martensite + Carbide | 700 | |
| 18 | High speed steel | C0.8%, Cr4%, Mo5%, W6%, V2% | SKH51 | Powder sintering | Quench/Tempering | Martensite + Carbide | 800 | |
| 19 | Maraged steel | Ni18%, Co9%, Mo5%, Ti0.4% | | Rolling | Quench/Tempering | Martensite | 850 | |
| 20 | Ausformed steel | C0.4%, Cr5%, Mo1.3%, Si1% | | Rolling | Quench/Tempering | Martensite | 900 | |
| 21 | Bearing steel (Alloy steel) | C1%, Cr1.5%, Si0.2% | SUJ2 | Rolling | Quench/Tempering | Martensite + Carbide | 760 | |

TABLE 2

| Condition No. | Friction Material Sample No. Vibrating Member | Friction Material Sample No. Movable Member | Contact Force (N) | Friction Coefficient μ | Wear (μm) per 10 km of relative movement Vibrating Member | Wear (μm) per 10 km of relative movement Movable Member | Evaluation |
|---|---|---|---|---|---|---|---|
| L1 | 4 | 6 | 4.0 | 0.58 | 200 | 80 | Inferior |
| 2 | 4 | 7 | 4.0 | 0.58 | 20 | 10 | Good |
| 3 | 1 | 7 | 4.0 | 0.58 | 80 | 30 | Inferior |
| 4 | 2 | 7 | 4.0 | 0.58 | 150 | 50 | Inferior |
| 5 | 3 | 7 | 4.0 | 0.58 | 10 | 6 | Good |
| 6 | 5 | 7 | 4.0 | 0.58 | 8 | 4 | Good |
| 7 | 8 | 7 | 4.0 | 0.58 | 250 | 170 | Inferior |
| 8 | 9 | 7 | 4.0 | 0.58 | below 1 | 4 | Good |
| 9 | 10 | 7 | 4.0 | 0.58 | 2 | 10 | Good |
| 10 | 11 | 7 | 4.0 | 0.58 | below 1 | 6 | Good |
| 11 | 11 | 6 | 4.0 | 0.58 | 4 | 50 | Inferior |
| 12 | 12 | 7 | 4.0 | 0.58 | 25 | 17 | Rather inferior |
| 13 | 14 | 7 | 4.0 | 0.58 | 3 | 12 | Good |
| 14 | 11 | 11 | 6.5 | 0.36 | below 1 | below 1 | Excellent |
| 15 | 11 | 14 | 6.5 | 0.36 | below 1 | below 1 | Excellent |

TABLE 3

| Condition No. | Friction Material Sample No. Vibrating Member | Friction Material Sample No. Movable Member | Contact Force (N) | Friction Coefficient μ | Wear (μm) per 10 km of relative movement Vibrating Member | Wear (μm) per 10 km of relative movement Movable Member | Evaluation |
|---|---|---|---|---|---|---|---|
| H1 | 4 | 7 | 20.0 | 0.52 | Broken | Broken | Inferior |
| 2 | 3 | 7 | 20.0 | 0.52 | Broken | Broken | Inferior |
| 3 | 5 | 7 | 20.0 | 0.52 | Broken | Broken | Inferior |
| 4 | 9 | 7 | 20.0 | 0.52 | below 1 | 35 | Inferior |
| 5 | 10 | 7 | 20.0 | 0.52 | below 1 | 47 | Inferior |
| 6 | 11 | 7 | 20.0 | 0.52 | below 1 | 40 | Inferior |
| 7 | 14 | 7 | 20.0 | 0.52 | 2 | 58 | Inferior |
| 8 | 11 | 11 | 32.5 | 0.32 | below 1 | below 1 | Excellent |
| 9 | 11 | 14 | 32.5 | 0.32 | below 1 | below 1 | Excellent |
| 10 | 11 | 10 | 32.5 | 0.32 | below 1 | below 1 | Excellent |
| 11 | 11 | 12 | 32.5 | 0.32 | 3 | 25 | Rather Inferior |
| 12 | 11 | 13 | 32.5 | 0.32 | 2 | 17 | Rather inferior to Good |
| 13 | 15 | 15 | 32.5 | 0.32 | below 1 | below 1 | Excellent |
| 14 | 16 | 16 | 32.5 | 0.32 | below 1 | below 1 | Excellent |
| 15 | 17 | 17 | 32.5 | 0.32 | below 1 | below 1 | Excellent |
| 16 | 18 | 18 | 32.5 | 0.32 | below 1 | below 1 | Excellent |
| 17 | 19 | 19 | 32.5 | 0.32 | below 1 | below 1 | Excellent |
| 18 | 20 | 20 | 32.5 | 0.32 | below 1 | below 1 | Excellent |
| 19 | 21 | 21 | 32.5 | 0.32 | below 1 | below 1 | Excellent |
| 20 | 11 | 19 | 32.5 | 0.32 | below 1 | below 1 | Excellent |
| EH1 | 15 | 15 | 50.0 | 0.30 | 6 | 2 | Good |
| 2 | 19 | 19 | 50.0 | 0.30 | 4 | 2 | Good |
| 3 | 18 | 18 | 50.0 | 0.30 | below 1 | below 1 | Excellent |

A discussion will now be made of the results of the tests. It will be understood that very small wear amounts were observed with combinations of friction members when each of these friction member is made of an iron alloy, as in the cases of Condition L14 in Table 2 and Conditions H8 and H13 in Table 3.

It was also found, however, that each friction member has to have a hardness above a certain level when the motor operates under a high contact pressure between the friction members, even when the friction members are made of stainless steel or stainless steels, as will be noted from Condition H11.

In order that ultrasonic wave motors provide advantages over electromagnetic motors with regard to output torque, it is expected that the requirements on friction members will become much more severe. More practically, if the conditions shown in Table 2 apply to existing ultrasonic wave motors, conditions shown in Table 3 will have to be met by future ultrasonic wave motors. It was found that, in order to overcome such severe conditions, the hardness of the friction material is preferably 600 or higher in terms of Vicker's hardness.

Figure 2:
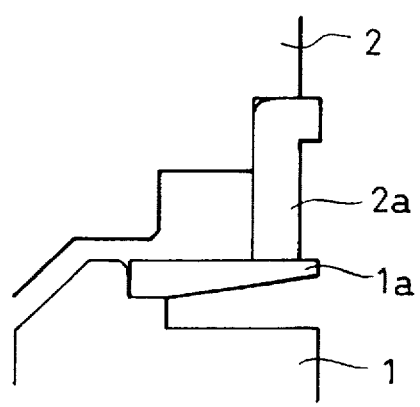
FIG. 2 is a fragmentary enlarged view of the ultrasonic wave motor of FIG. 1, showing particularly a region where two members make friction contact with each other.

FIG. 2 is a fragmentary enlarged view of the ultrasonic wave motor, showing particularly the region where two members make friction contact with each other. In this embodiment, the breadth of the friction surface on the vibrating member 1 is 0.1 mm, while the breadth of the friction surface on the movable member 2 is 0.3 mm. Thus, the actual frictional contact between the mating members takes place over only a breadth of 0.1 mm which equals the breadth of the friction surface on the vibrating member 1.

In this embodiment, the diameter of the interface of mutual frictional contact of the friction surfaces is 8.58 mm, so that the area of frictional contact is 2.7 mm$^2$. The friction member 2a on the movable member is held in pressure contact with the friction member of the vibrating member by the action of the coiled spring 4. The force exerted by the coiled spring 4 is from 4N to 20N (0.4 kg·f to 2.0 kg·f). The contact pressure is therefore from 1.5 Pa to 7.5 Pa. The diameter and the length of the motor used in this embodiment is 10 mm and 25 mm, respectively.

The tests and evaluation in this embodiment were executed on the ultrasonic wave motor having the above-described specifications. Combinations of friction members capable of achieving lives long enough to meet practical demands, e.g., about 1000 hours, would be obtainable if the embodiment is carried out under a contract pressure below the range of contact pressure specified above (i.e., below about 4N). However, it will be necessary that the friction materials are capable of bearing a contact pressure falling within the range specified above, calculating from the friction coefficients, in order to fully utilize the advantage of the ultrasonic wave motor over electromagnetic motor, i.e., large output torque. The inventors have confirmed that such a requirement is met when the material hardness is 600 or higher in terms of Vicker's hardness Another factor which is to be specifically noted is the relationship between the amount of wear and the hardness of the material. It is true that, provided that the hardness of one of the friction members is held constant, the mating friction member exhibits smaller wear amount when its hardness is higher, as demonstrated also in the tests as described. However, under severe testing conditions, different materials exhibit different amounts of wear even when they have an equal hardness.

More specifically, two types of steel having the same level of hardness are assumed: a first type which has a uniform metallurgical structure composed mainly of martensite (or troostite or sorbite according to the conditions of tempering) as is the case of a carbon steel, and a second type having a structure composed of martensite and cementite dispersed therein as in the case of carbon tool steel. Obviously, the second type of steel exhibits greater resistance to wear than the first type of steel, even though they have the same level of hardness from a macroscopic point of view.

For the same reason, it is expected that chromium carbide in a martensitic stainless steel and tungsten carbide and vanadium carbide in high-speed steel contribute greatly to improvement in wear resistance, since these carbides per se have Vicker's hardness of 1500 or higher.

It is to be noted, however, that these carbides do not cause substantial rise in the hardness of the overall material when they are finely dispersed in the matrix or base metal.

This means that the friction member used in an ultrasonic wave motor preferably has a structure which is hard and which has carbides finely dispersed in the matrix, unless such carbides form nuclei for fatigue breakdown or impact breakdown. These facts are demonstrated by the test results under Conditions EH2 and EH3 which employed specifically severe contact pressure.

More specifically, when a high speed steel (an alloy steel that remains hard and tough at red heat, used as tool material) and a maraged steel are compared, the former exhibits greater resistance to wear, although it has lower hardness than the latter. Anyway, the Conditions EH2 and EH3 are much more severe than those applied to the state of art ultrasonic wave motors. These conditions have been employed purely for the purpose of evaluating and distinguishing materials of friction members.

It is further preferred to select materials which have not only high hardness but also structures in which large quantities of hard carbides are finely dispersed in the matrix, as is the case of high speed steel, if the use of such expensive materials do not violate the requirements from the view point of production cost.

The high speed steel employed in the Lest had undergone high-temperature steaming treatment for the purpose of forming Fe$_3$O$_4$ film on the friction member. The temperature of this treatment conveniently coincides with the temperature of tempering of the high speed steel.

After completion of the 10 km endurance Lest, the ultrasonic wave motors employing iron vs. iron or iron alloy vs. iron alloy combinations were disassembled to enable microscopic observation of the friction surfaces, and the presence of blue color films were confirmed in all of the iron and iron alloy friction surfaces.

It is believed that these blue color films are Fe$_3$O$_4$, although they are chromium oxide films when the base material is a stainless steel. The F$_3$O$_4$ film can be formed without delay on the surfaces which make direct friction contact with each other, by the heat generated as a result of the friction. If it is required to eliminate rusting on areas other than the friction surfaces, it is advisable, as stated before, to form an Fe$_3$O$_4$ film on the portions of each friction member which are not to be brought into direct friction contact.

A better result will be obtained if films of several microns thick are formed beforehand by, for example, non-electrolytic Ni—P plating.

When such a plating film is formed, the film may be removed, for example, by lapping from the surface which makes direct friction contact with the mating member. The removal of such a plating film, however, is not essential. Namely, when the friction members with the plating films remaining on the frictional contact surfaces, such films are worn shortly after the start of use, so as to expose the underlying iron alloy surfaces on which Fe$_3$O$_4$ films are formed without delay. Thus, wear resistant Fe$_3$O$_4$ films can be formed without any risk of rusting of portions other than the friction surfaces.

The use of stainless steel as the material of the friction member ensures further improved safety and reliability because the chromium oxide film formed on the friction member of stainless steel provides a greater protective effect than Fe$_3$O$_4$ against rusting.

The type of friction in the ultrasonic motors employed in this embodiment is so-called dry friction, i.e., non-lubricated friction. Actually, however, the friction surfaces of the friction members were subjected to ultrasonic cleaning in acetone, before these materials were put Lo use.

As well known to those skilled in the art, the surface region of a metal member has a stratified configuration including a core base metal portion, an overlying metallic portion constituted by the base metal deformed, decarburized or otherwise changed, an oxide film portion, a water adsorption portion containing water adsorbed thereon, and an outermost contaminant portion containing oil and other matters. Execution of the above-mentioned acetone cleaning means that the outermost contaminant region has been removed.

Change in the type of cleaning solution and/or cleaning time did not bring about any significant change in the friction coefficient as confirmed through sliding between two friction members and in the motor start-up torque. The inventors therefore found that the contaminant region need nor be strictly considered.

Referring now to the water adsorbed, it is clear that the film thickness of adsorbed water increases in accordance with an increase in the relative humidity. Water is condensed in the extremely small gap between the friction surfaces so as to cause stiction which is a phenomenon that two members sick to each other due to presence of water therebetween.

The inventors, however, confirmed that, as a matter of fact, torque vs. speed performance of the ultrasonic wave motors used in this embodiment is not substantially changed even when the relative humidity is changed, although a change in the relative humidity causes a difference in the ease of start-up of the motors.

This fact suggests that the water adsorbed does not substantially affect the motor operation as long as the motor is operating, more specifically, when a phenomenon constantly occurs in which part of the friction surface belonging to the movable member is separated from the friction surface belonging to the vibrating member as a result of the vibration of the vibrator, i.e., when the separating phenomenon constantly occurs under vibration in the form of a standing wave. It is thus confirmed that, among the above-mentioned portions of the surface region, the outermost contaminant portion and the underlying water adsorption portion do not substantially affect the friction in the ultrasonic wave motor. Thus, the portions which directly affect the friction in the ultrasonic wave motor are the oxide film portion and the portions underlying this portion. To sum up, it is understood that the kind of the oxide film and the state of the oxide film are the important factors.

However, attention should be paid to the following fact. In general, an oxide film has an extremely small thickness (0.003 to 0.010 µm when the stainless steel is kept under normal environment). Therefore, application of a large pressing force acting between mating friction members may cause deformation or rupture of the base material portion under the oxide film, with the result that the oxide film itself is broken so as to allow direct mutual contact and adhesion between the base metals of these two friction members The mutual direct contact and adhesion of the base metals lead to the aforesaid severe wear which causes shear of the core metals. Thus, the base metals of the friction members have to have a hardness large enough to overcome the pressing force and frictional force acting between the friction surfaces of mating friction members.

Second Embodiment

Figure 3A:
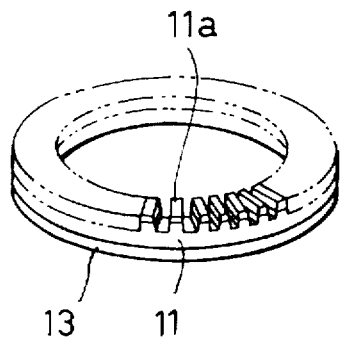
FIGS. 3(a) to 3(c) are illustrations of an ultrasonic wave motor as a second embodiment of the present invention.
Figure 3B:
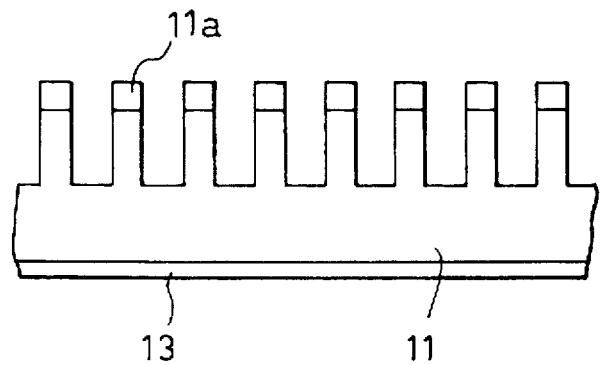
Figure 3C:
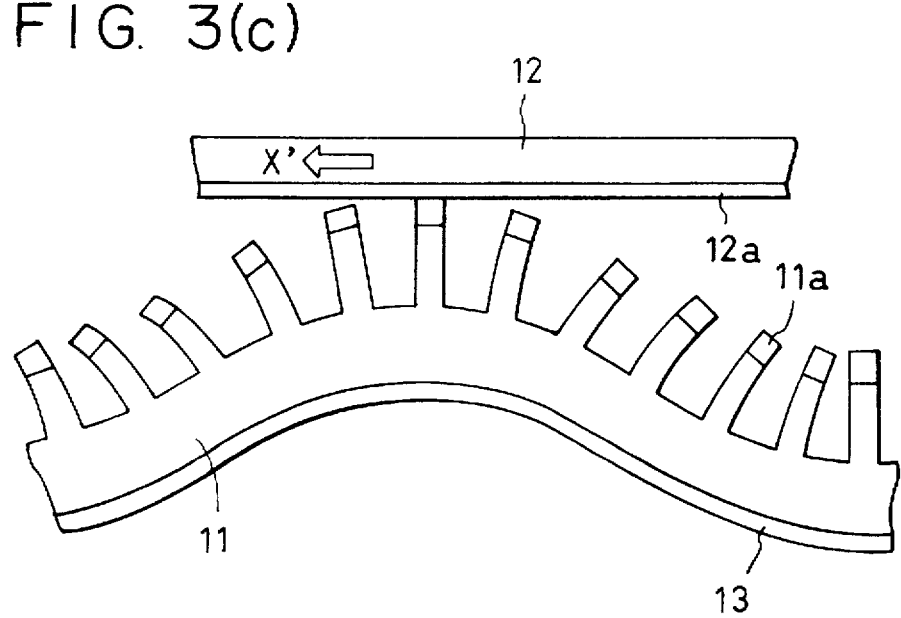

FIGS. 3(a) to 3(c) show a second embodiment of the present invention in which the friction materials described before in connection with the first embodiment are used in a ring-type ultrasonic wave motor as a ring-type vibration wave actuator. The detail of this actuator are disclosed in the specification of U.S. Pat. No. 4,580,073 and detailed description thereof is omitted in this specification.

Referring to FIGS. 3(a) to 3(c), a vibrating member 11 has numerous projections formed thereon. A friction member 11a of the same material as the friction member 1a described before is fixed to the end surface, i.e., contact portion, of each projection. A movable member 12 serves as a contact member and has a contact portion to which is fixed a friction member 12a of the same material as the friction member 2a used in the preceding embodiment An electromechanical energy transducer 13 is fixed to the vibrating member 11 so as to generate a progressive vibration wave on the projections of the vibrating member 11 when supplied with an A.C. voltage. Obviously, the relationship between the vibrating member 11 and the contact member 12 is reversible such that the contact member 12 rotates when the vibrating member 11 is fixed. Alternatively, if the contact member 12 is fixed, then the vibrating member 11 rotates.

Third Embodiment

An unexpected thing happened in the course of the experiments conducted by the inventors under various conditions using ultrasonic wave motors having friction members made of iron or iron alloy. Briefly, the inventors unexpectedly found that there are two forms of mild wear.

In one of these two forms, an oxide film generated by the effect of friction heat and exhibiting various colors according to thickness exists on the friction surface, so that the actual friction surface is presented by this oxide film.

The second form of mild wear appears such that the friction surface presents the color of iron (silver).

The first-mentioned type of mild wear took place under less severe conditions: namely, when factors such as the stress acting perpendicularly to the friction surface, friction force acting in parallel with the friction surface and the velocity of relative movement between two friction surfaces are small.

In this case, actual friction takes place between the oxide films of the two members, developing only small frictional force. Thus, the oxide film seems to act as a lubricant film. No powder particles generated as a result of the wear could be observed through an optical microscope. Presumably, the quantity of the wear particles is extremely small. As a matter of fact, almost no thickness reduction due to wear was observed. It is likely that the oxide constituting the oxide film is transferred from one friction surface to the other and vice versa.

The second form of mild wear in which the friction surfaces exhibits silver color occurred under more severe conditions. In this case, tho friction force was 2 times as large as that in the first form of mild wear. Although red brown wear powder particles were generated, the particles are microfine and not sticky. Presumably, the powder particles are oxide particles such as $Fe_2O_3$ and $Fe_3O_4$, which exhibit smaller cohesion.

Either form of mild wear or friction is believed to be advantageous when employed in an ultrasonic wave motor. A problem, however, occurs when these two forms of mild wear simultaneously take place in a single designed motor.

More specifically, the load level and the operation speed (rotation speed in the case of a rotary-type motor) are not always constant during the service of the motor. Since two forms of mild wear provide different friction coefficient values, motor performance tends to vary from time to time.

The friction relying upon the first form of mild wear, i.e., oxide film, is advantageous because it exhibits almost no wear, although the friction coefficient is small in this form of friction. However, the force with which the contact member is pressed against the vibrating member has to be increased so as to compensate for the smallness of the friction coefficient, posing a problem from the view point of ultrasonic wave motor structure.

This embodiment is intended to provide a solution to this problem, by making it possible to stably maintain the second form of mild wear.

To this end, the third embodiment employs the following measures:

(1) To remove oxide film by grinding effect performed by the mating friction member, before the oxide film grows thicker.
(2) To remove the oxide film by friction powder grains generated as a result of friction, before the oxide film grows thicker; and
(3) To prevent generation of oxide film having small friction coefficient, by adding special elements.

In this embodiment, the friction members were prepared by cutting a variety of ferrous materials For instance, a disk-shaped member with a central hole, similar to a flat washer, was used as the friction member 1a on the vibrating member of an ultrasonic wave motor as the vibration wave actuator of the type shown in FIG. 1. The friction member 1a was fixed to a vibrating member 1 such that the central hole receives and fits on the vibrating member 1. The friction slide surface which is designed to make friction contact with a friction member 2a on the movable member 2 was lapped with diamond grains having an average grain size of 1 μm.

Meanwhile, the friction member 2a on the movable member 2 has a form obtained by slicing a tube, one axial end of the slice being adapted to make frictional contact with the friction material 1a of the vibrating member 1. This surface has been lapped beforehand with diamond grains having an average grain size of 1 μm. This friction member 2a is fixed on the movable member 2 by fitting the friction member 2a on the peripheral surface of the movable member 2.

A test motor was thus prepared. Although the instant embodiment was arranged such that the movable member 2 rotates while the vibrating member 1 is stationed, the arrangement may be such that the vibrating member 1 rotates relative to a contact member 2 which is stationary. Eleven different combinations of friction members with a variety of friction materials were prepared and tested.

Specifications of the ferrous materials used as the friction materials are shown in Table 4, while Table 5 shows friction characteristics, friction coefficients and colors exhibited by friction surfaces, as observed on these combinations of friction materials.

The tests were executed in an indoor environment, by applying load torque to the motors by loading the output gear 5 through the output gear 6 of each motor. Two levels of load torque were applied: $2\times10^{-3}$ N·m and $6\times10^{-3}$ N·m. Each motor was made to run for 1 hour at 900 r.p.m. (relative velocity between two friction members being 0.4 m/s), thus achieving a relative movement distance of 1440 m, and then subjected to the measurement and observation of the abovementioned items. The contact pressure acting between friction sliding surfaces was set to 2(Pa). In each of the tests carried out under the abovementioned two levels of load torque, the friction members were tested in a fresh state, i.e., in the state as lapped

TABLE 4

| Sample No. | Material | Composition (wt %) | JIS | Processing Method | Treatment | Structure | Surface Hardness (Vickers) | | Remarks |
|---|---|---|---|---|---|---|---|---|---|
| 31 | Iron or Iron alloy | Carbon steel | C 0.45% | S45C | Cutting | Quench/Tempering | Martensite | 720 | |
| 32 | | Carbon tool steel | C 1% | SK3 | Cutting | Quench/Tempering | Martensite | 760 | Tempering 200° C. |
| 33 | | Carbon tool steel | C 1% | SK3 | Cutting | Quench/Tempering | Martensite | 630 | Tempering 300° C. |
| 34 | | Carbon tool steel | C 1% | SK3 | Cutting | Quench/Tempering | Martensite | 510 | Tempering 400° C. |
| 35 | | Martensitic stainless steel | Cr 17%, C 1% | SUS440C | Cutting | Quench/Tempering | Martensite + Carbide | 720 | |
| 36 | | | Cr 17%, C 1%, Mo 2% | | Cutting | Quench/Tempering | Martensite + Carbide | 720 | |
| 37 | | | Cr 17%, C 1%, Al 3% | | Cutting | Quench/Tempering | Martensite + Carbide | 720 | |
| 38 | | | Cr 17%, C 1%, Si 3% | | Cutting | Quench/Tempering | Martensite + Carbide | 720 | |
| 39 | | Precipitation hardened stainless steel | Cr 17%, Ni 7%, Al 1% | SUS631 | Cutting | Aging | Work-induced martensite | 570 | |
| 40 | | | Cr 15%, Ni 7%, Si 4%, Mo 1% | | Cutting | Aging | Work-induced martensite | 690 | |
| 41 | Hard coat film | Chromium | Cr | | Electroplating | | | 850 | Film thickness 30 μm, Base material Sample No. 32 |
| 42 | | Nitrided film | FenNm | | Nitriding with special gas | | | 1000 | Film thickness 20 μm, Base material SUS 316 |
| 43 | | Titanium nitride | TiN | | PVD | | | 1800 | Film thickness 3 μm, Base material Sample No. 35 |
| 44 | | Titanium nitride | TiN | | PVD | | | 1800 | Film thickness 3 μm, Base material Sample No. 40 |
| 45 | | Titanium nitride | TiN | | PVD | | | 1800 | Film thickness 3 μm, Base material Sample No. 48 |
| 46 | | Titanium carbide | TiC | | CVD | | | 2500 | Film thickness 3 μm, Base material Sample No. 48 |
| 47 | | Tungsten carbide | WC | | CVD | | | 2200 | Film thickness 3 μm, Base material Sample No. 48 |
| 48 | Cermet | | WC 90%, Co 10% | | Sintering | | | 920 | Hardness converted from $H_RA85$ |
| 49 | Ceramic | | $Al_2O_3$ 99.7% | | Sintering | | | 1500 | |

TABLE 5

Results of Endurance Test after 1-hour Motor Operation at 900 r.p.m (25° C., RH60%)

| Friction Material Sample No. | | Under Load Torque of $2 \times 10^{-3}$ N·m | | | | | Under Load Torque of $6 \times 10^{-3}$ N·m | | | | |
|---|---|---|---|---|---|---|---|---|---|---|---|
| | | Wear (μm) | | | Color of Friction Surface | | Wear (μm) | | Friction | Color of Friction Surface | |
| Vibrating Member | Movable Member | Vibrating Member | Movable Member | Fricition Coefficient | Vibrating Member | Movable Member | Vibrating Member | Movable Member | Coefficient | Vibrating Member | Movable Member |
| 31 | 31 | ≦0.1 | ≦0.1 | 0.25 | Blue | Blue | 7 | 2 | 0.55 | Silver | Silver |
| 32 | 32 | ≦0.1 | ≦0.1 | 0.25 | Blue | Blue | 4 | 1 | 0.55 | Silver | Silver |
| 32 | 33 | ≦0.1 | 0.5 | 0.55 | Silver | Silver | 2 | 7 | 0.55 | Silver | Silver |
| 32 | 34 | 0.2 | 3 | 0.55 | Silver | Silver | 5 | 20 | 0.55 | Silver | Silver |
| 35 | 35 | ≦0.1 | ≦0.1 | 0.25 | Blue | Blue | 5 | 1 | 0.55 | Silver | Silver |
| 36 | 36 | ≦0.1 | ≦0.1 | 0.25 | Blue | Blue | 7 | 2 | 0.55 | Silver | Silver |
| 35 | 37 | 0.3 | ≦0.1 | 0.55 | Silver | Silver | 5 | 2 | 0.55 | Silver | Silver |
| 35 | 38 | 0.1 | 0.5 | 0.55 | Silver | Silver | 3 | 7 | 0.55 | Silver | Silver |
| 35 | 39 | 0.2 | 2 | 0.55 | Silver | Silver | 6 | 12 | 0.55 | Silver | Silver |
| 35 | 40 | 0.2 | 0.1 | 0.55 | Silver | Silver | 5 | 2 | 0.55 | Silver | Silver |
| 31 | 35 | ≦0.1 | ≦0.1 | 0.55 | Silver | Silver | 5 | 3 | 0.55 | Silver | Silver |

| Friction Material Sample No. | | Evaluation | | |
|---|---|---|---|---|
| Vibrating Member | Movable Member | Wear | Motor Performance Stability | Overall Evaluation |
| 31 | 31 | Excellent | Inferior | Inferior |
| 32 | 32 | Excellent | Inferior | Inferior |
| 32 | 33 | Excellent | Excellent | Excellent |
| 32 | 34 | Good | Excellent | Good |
| 35 | 35 | Excellent | Inferior | Inferior |
| 36 | 36 | Excellent | Inferior | Inferior |
| 35 | 37 | Excellent | Excellent | Excellent |
| 35 | 38 | Excellent | Excellent | Excellent |
| 35 | 39 | Good | Excellent | Good |
| 35 | 40 | Excellent | Excellent | Excellent |
| 31 | 35 | Excellent | Excellent | Excellent |

Measuring conditions and other details will be described with reference to Table 5 which shows the results of the endurance test. The wear amount was determined in terms of the height or depth of wear by using a surface profile measuring instrument. The amount of wear of the friction member on the movable member was measured by using a surface 2b of the movable member as a reference surface. The friction coefficient was measured by determining the maximum torque Tmax from a speed-torque drooping curve of each motor obtained immediately after the endurance test, and then determining the friction coefficient from the following equation, using the thus determined maximum torque Tmax.

Friction coefficient $\mu = Tmax/W \times (D/2)$ where W represents the pressing force acting between friction sliding surfaces, and D represents the mean diameter of the friction sliding surfaces.

The values of the friction coefficient have been rounded at 0.05. The colors of the friction sliding surface were observed through an optical microscope.

Blue colors are considered to be the colors of oxide films formed by the action of friction heat. It was confirmed that the samples showing blue colors exhibit small values of friction coefficient around 0.25.

Presumably, the oxide films play roles similar to those of solid lubricants. It was also confirmed that wear amounts are extremely small in the samples exhibiting blue colors.

In Tables 4 and 5, the amount of wear exhibited by these samples is shown as being 0.1 μm or less. This is because the presence of comparatively sharp scratches of depths almost reaching 0.1 μm, which would have been formed in the running-in period at the beginning of the endurance tests, were recognized through measurement by the surface profile measuring instrument.

Although not shown in Tables 4 and 5, a 500-hour endurance test (Distance of relative movement being 730 km) test was also conducted by using the materials of Sample No. 35 for both of the vibrating friction member and the moving friction member, under a load torque of $2 \times 10^{-3}$ N·m. The test showed that the wear amount did not substantially grow from the value of 0.1 μm. Furthermore, almost no change in the color of the friction surfaces was observed. This indicates a marvelous effect that, once the state of friction surfaces exhibiting blue color is established, no substantial further wear takes place.

Insofaras the ultrasonic wave motor is used under the above-mentioned condition, the combination stated above can be advantageously used as the materials of friction members in the motor, although it provides only a small friction coefficient. This embodiment is to propose a combination of friction materials which simultaneously achieves reduction in the wear amount and high stability of the friction coefficient under various load conditions.

As to the results of the evaluation, combinations which showed a wear amount of 10 μm or less for each of the vibrating friction member and the movable friction member under a load torque of $6 \times 10^{-3}$ N·m were ranked as "excellent". Combinations exhibiting a wear amount of 10 μm to 30 μm are evaluated as being "good". Combinations exhibiting a wear amount of 30 μm to 100 μm are evaluated as being "rather inferior", and combinations exhibiting wear amounts exceeding 100 μm are evaluated as "inferior".

In the test executed under the condition stated above, however, no combination which would be evaluated as "rather inferior" or "inferior" was found.

The stability of motor performance is equivalent to stability of friction coefficient against variation of operating conditions. In the present test, no combination could be found which would constantly show a friction coefficient around 0.25.

Friction materials to be used in the motors of the kind described have to simultaneously meet both the requirement for small wear and the requirement for stability of motor performance. Overall evaluation, therefore, was made such that a combination which is ranked as being "inferior" in either the "wear" or the "motor performance stability" category is evaluated as being "inferior" in the overall evaluation. As a result of these studies and research, friction materials could be selected which constantly exhibit a silver color (metallic color) of the friction surfaces and which maintain friction coefficients at a comparatively high level of 0.55 or so.

Apart from the study and research stated above, a test was conducted in which motors employing the respective combinations of friction materials were shelved for a long time under 70° C. environment of 90% relative humidity, and drooping characteristics of these motors were examined. No substantial change in drooping characteristic was observed in any of these motors. However, Sample Nos. 31 to 34 showed generation of rust, while Sample Nos. 35 to 40, which are stainless steels, did not show any rusting.

When the ultrasonic wave motors are required to operate in a more severe environment, it is preferred that the stainless steel contains 1 to 3% of molybdenum (Mo). This element effectively resists the occurrence of "clearance corrosion" which tends to occur when a tiny space is left between friction sliding surfaces.

It was also found that the state in which friction surfaces exhibit blue colors is easier to obtain when both the friction member on the vibrating member and the friction member on the movable member are made of the same material.

It is to be noted, however, that the state exhibiting blue color cannot be obtained even when the compositions of the materials of both friction members are the same, if these members are formed to have different hardness or if the composition contains aluminum (Al) or silicon (Si). It is believed that alumina ($Al_2O_3$) or glass ($SiO_2$), which are said to be formed in the surface region of a metal, act to suppresses growth of oxide film such as $Fe_2O_3$ or $Fe_3O_4$.

As to the hardness of the materials, it was found that the wear amount decreases when the material hardness increases, under conditions which generate a silver color of friction surfaces. In practice, a hardness of 600 or higher in terms of Vicker's hardness is preferred.

A combination of a carbon steel used as the material of one of the friction members and a martensitic stainless steel used as the material of the other friction member, both materials having the same hardness, showed silver colors of friction surfaces even after the endurance test conducted under the smaller load torque.

Presumably, since components of these members are blackened, these two materials would have showed a difference in speed of growth of oxide films and other properties, so that one of these materials was ground by the other. The ground material forms fine oxide wear powder particles which act in the same manner as grains used in lapping so as to wear the mating material even when the latter is hard.

It is to be understood, however, that the above-mentioned oxide wear powder is rather soft when the friction material is iron. On the other hand, an iron base member can easily have a Vicker's hardness of 600 or higher, if it has been transformed to have a martensitic structure. Such high iron base metal cannot easily be ground by soft oxide wear powder. This is believed to be the reason why a comparatively high wear resistance is achieved.

Fourth Embodiment

Table 6 shows combinations of friction materials used in a fourth embodiment, together with the results of endurance tests executed on these combinations. The items and conditions in regard to Table 6 are not described in detail because they are the same as those described before in connection with the third embodiment.

In this case, one of the friction materials is ferrous material in all these combinations. Hard films having a Vicker's hardness of 800 or higher were selected as the mating friction materials and were formed on the surfaces of the movable friction members

TABLE 6

| Friction Material Sample No. | | Results of Endurance Test after 1-hour Motor Operation at 900 r.p.m (25° C., RH60%) | | | | | | | | |
|---|---|---|---|---|---|---|---|---|---|---|
| | | Under Load Torque of $2 \times 10^{-3}$ N · m | | | | | Under Load Torque of $6 \times 10^{-3}$ N · m | | | |
| | | Wear (μm) | | Fricition Coefficient | Color of Friction Surface | | Wear (μm) | | Friction Coefficient | Color of Friction Surface | |
| Vibrating Member | Movable Member | Vibrating Member | Movable Member | | Vibrating Member | Movable Member | Vibrating Member | Movable Member | | Vibrating Member | Movable Member |
| 32 | 41 | ≦0.1 | ≦0.1 | 0.40 | Silver | Silver | 3 | 1 | 0.40 | Silver | Silver |
| 32 | 42 | 0.2 | ≦0.1 | 0.55 | Silver | Silver | 7 | 3 | 0.55 | Silver | Silver |
| 32 | 43 | ≦0.1 | ≦0.1 | 0.35 | Silver | Gold | — | — | Base Material Exposed | Silver | Silver |
| 32 | 44 | ≦0.1 | ≦0.1 | 0.35 | Silver | Gold | — | — | Base Material Exposed | Silver | Silver |
| 32 | 45 | ≦0.1 | ≦0.1 | 0.35 | Silver | Gold | 2 | ≦0.1 | 0.35 | Silver | Gold |
| 32 | 46 | ≦0.1 | ≦0.1 | 0.45 | Silver | Silver | 2 | ≦0.1 | 0.45 | Silver | Silver |
| 32 | 47 | ≦0.1 | ≦0.1 | 0.45 | Silver | Silver | 3 | ≦0.1 | 0.45 | Silver | Silver |
| 32 | 48 | 0.2 | ≦0.1 | 0.55 | Silver | Silver | 5 | ≦0.1 | 0.55 | Silver | Silver |
| 32 | 49 | ≦0.1 | ≦0.1 | 0.65 | Silver | White | 0.2 | ≦0.1 | 0.65 | Silver | White |
| 34 | 48 | 2 | 0.3 | 0.55 | Silver | Silver | 35 | 2 | 0.55 | Silver | Silver |
| 35 | 48 | ≦0.1 | ≦0.1 | 0.55 | Silver | Silver | 3 | ≦0.1 | 0.55 | Silver | Silver |

TABLE 6-continued

| 37 | 48 | 0.2 | ≦0.1 | 0.55 | Silver | Silver | 7 | ≦0.1 | 0.55 | Silver | Silver |
| 38 | 48 | 0.2 | ≦0.1 | 0.55 | Silver | Silver | 6 | ≦0.1 | 0.55 | Silver | Silver |

| Friction Material Sample No. | | Evaluation | | |
| --- | --- | --- | --- | --- |
| Vibrating Member | Movable Member | Wear | Motor Performance Stability | Overall Evaluation |
| 32 | 41 | Excellent | Excellent | Excellent |
| 32 | 42 | Excellent | Excellent | Excellent |
| 32 | 43 | Inferior | Inferior | Inferior |
| 32 | 44 | Inferior | Inferior | Inferior |
| 32 | 45 | Excellent | Excellent | Excellent |
| 32 | 46 | Excellent | Excellent | Excellent |
| 32 | 47 | Excellent | Excellent | Excellent |
| 32 | 48 | Excellent | Excellent | Excellent |
| 32 | 49 | Excellent | Excellent | Excellent |
| 34 | 48 | Rather Inferior | Good | Rather Inferior |
| 35 | 48 | Excellent | Excellent | Excellent |
| 37 | 48 | Excellent | Excellent | Excellent |
| 38 | 48 | Excellent | Excellent | Excellent | formed by cutting or sintering from the base materials shown in the "Remarks" of Table 4.

The surfaces of the movable friction members serving as friction sliding surfaces were lapped with diamond grains of 1 μm grain size and were bonded to the movable members 2. The reason why only the materials exhibiting a Vicker's hardness of 800 or higher were used is as follows. It has been recognized through the discussion in connection with the third embodiment that the wear amount becomes smaller when the hardness of the friction member increases. If the film formed on the movable member is softer than the ferrous material used as the vibrating friction member, wear will proceed faster with this film than with the ferrous material, so that the life of service of the motor will expire when this film is worn away. This is the reason why the films of Vicker's hardness of 800 or higher are exclusively used.

The same applies also to the cases of cermet and ceramics. Namely, performance superior to those exhibited by the third embodiment cannot be obtained unless the cermet and the ceramics are sufficiently hard. The samples made from cermet and ceramics were fabricated by sintering, followed by lapping as stated above.

The friction materials having a Vicker's hardness of 800 or higher were used only as the material of the movable friction members. The loads or burdens imposed on friction members are interactive and mutual, i.e., act equally on both friction members, so that the same results would have been obtained even if such hard materials were used as the materials of the vibrating friction members.

The reason why a nitrided film was formed on extremely corrosion resistant SUS 316 stainless steel is as follows. The same applied also to the case of a carburized film. Nitrogen or carbon existing in a stainless steel tends to react with chromium in the stainless steel so as to form chromium nitride or chromium carbide. Corrosion resistance is drastically reduced in the regions around such nitride or carbide. In order to obviate this problem, a stainless steel which is rich in Ni and which contains also Mo, thus presenting enhanced corrosion resistance, is used so as to compensate for the reduction in the corrosion resistance. Three types of materials were selected and used as the base metal for titanium nitride. When titanium nitride film is formed, the material is heated to a temperature ranging between 400° C. and 500° C. Such a high temperature poses a risk of reduction in the hardness of the base material.

In the present research and study, a TiN film remained even after the test under high load torque, only on the base material of cermet (superhard) which did not show any reduction in hardness. It is understood that the wear is ruled by hardness, i.e., resistance to deformation, of the base material, in view of the small thickness of the film.

Samples using ceramics (alumina) advantageously showed both large values of friction coefficient and wear resistance. The wear of the carbon tool steel used as the material of the mating friction member is smaller when alumina is used than when tungsten carbide (WC), which is harder than alumina, is used. This may be attributed to the fact that alumina as an oxide exhibits almost no dissolution into iron so that no substantial chemical wear is caused.

Other types of ceramics such as silicon carbide (SiC) and silicon nitride ($Si_3N_4$) are considered to provide large resistance to abrasive wear and a wear amount equivalent to that exhibited when WC is used, considering that these ceramics have a high Vicker's hardness of 100 or higher.

Fifth Embodiment

A research and study were made by employing ultrasonic wave motors having combinations of friction materials selected such that, as shown in Table 7, both the movable friction member and the vibrating friction member are made of the same materials having the same level of hardness, the materials being selected from stainless steels containing aluminum or silicon. Tests conducted by using such motors showed that the friction surfaces constantly exhibit silver colors regardless of the conditions of the test operations.

This is believed to be attributed to the following fact. $Al_2O_3$ film or $SiO_2$ film, formed on the surface of the friction member when the stainless steel contains aluminum or silicon, possesses an extremely small self-diffusion coefficient and, hence, has a thickness which is extremely small as compared with iron oxide film. In addition, such $Al_2O_3$ film or $SiO_2$ film is considered to have properties different from those of iron oxide film ($Fe_2O_3$ or $Fe_3O_4$) which is considered to act as a lubricant.

TABLE 7

| Friction Material | | Results of Endurance Test after 1-hour Motor Operation at 900 r.p.m (25° C., RH60%) | | | | | | | | | |
|---|---|---|---|---|---|---|---|---|---|---|---|
| | | Under Load Torque of $2 \times 10^{-3}$ N · m | | | | | Under Load Torque of $6 \times 10^{-3}$ N · m | | | | |
| Sample No. | | Wear (μm) | | | Color of Friction Surface | | Wear (μm) | | Friction | Color of Friction Surface | |
| Vibrating Member | Movable Member | Vibrating Member | Movable Member | Fricition Coefficient | Vibrating Member | Movable Member | Vibrating Member | Movable Member | Coefficient | Vibrating Member | Movable Member |
| 37 | 37 | ≦0.1 | ≦0.1 | 0.60 | Silver | Silver | 2 | 2 | 0.60 | Silver | Silver |
| 38 | 38 | ≦0.1 | ≦0.1 | 0.45 | Silver | Silver | 1 | 3 | 0.45 | Silver | Silver |
| 39 | 39 | 5 | 6 | 0.55 | Silver | Silver | 50 | 35 | 0.55 | Silver | Silver |
| 40 | 40 | ≦0.1 | ≦0.1 | 0.50 | Silver | Silver | 2 | 1 | 0.50 | Silver | Silver |

| Friction Material | | Evaluation | | |
|---|---|---|---|---|
| Sample No. | | | Motor | |
| Vibrating Member | Movable Member | Wear | Performance Stability | Overall Evaluation |
| 37 | 37 | Excellent | Excellent | Excellent |
| 38 | 38 | Excellent | Excellent | Excellent |
| 39 | 39 | Rather Inferior | Excellent | Rather Inferior |
| 40 | 40 | Excellent | Excellent | Excellent |

Sixth Embodiment

As a sixth embodiment of the present invention, a ring-type ultrasonic wave motor such as the ring-type vibration wave actuator of the type shown in FIGS. 3(a) to 3(c) were fabricated using friction materials discussed in the description of the third to fifth embodiments. The friction surfaces of these embodiments exhibited similar results and wear characteristics.

Although the present invention has been described with reference to the above-preferred embodiments, it is not limited thereto. Rather, those skilled in the art readily will appreciate numerous alternative and equivalent embodiments and modifications that are included within the scope and spirit of the present invention, which is defined by the following claims.

What is claimed is:

1. A vibration wave actuator, comprising:
 a vibrating member which generates a vibration wave therein, said vibration member including a first contact portion made of iron or an iron alloy and having an $Fe_3O_4$ film formed on a contact surface of the first contact portion; and
 a contact member which is held in contact with said vibrating member so as to be movable relative to said vibrating member by a dry friction force caused by said vibration wave,
 said contact member including a second contact portion contacting said vibration member made of iron or an iron alloy and having an $Fe_2O_4$ film formed on a contact surface of said second contact portion.

2. A vibration wave actuator according to claim 1, wherein a plating film is formed on a contact surface of each of said first and second contact portions.

3. A vibration wave actuator according to claim 2, wherein at least one of said first and second contact portions is made of a material containing carbon, together with at least one alloying element selected from the group consisting of chromium, molybdenum, vanadium and tungsten.

4. A vibration wave actuator according to claim 2, wherein at least one of said first and second contact portions is made of an ausformed steel or a maraged steel.

5. A vibration wave actuator according to claim 2, wherein at least one of said first and second contact portions is made of a stainless steel.

6. A vibration wave actuator according to claim 1, wherein at least one of said first and second contact portions is made of a material containing carbon, together with at least one alloying element selected from the group consisting of chromium, molybdenum, vanadium and tungsten.

7. A vibration wave actuator according to claim 1, wherein at least one of said first and second contact portions is made of an ausformed steel or a maraged steel.

8. A vibration wave actuator according to claim 1, wherein at least one of said first and second contact portions is made of a stainless steel.

9. A vibration wave actuator according to claim 8, wherein said first and second contact portions are made of materials having different compositions.

10. A vibration wave actuator according to claim 9, wherein at least one of said first and second contact portions is made of an iron alloy containing not less than 1 wt % of silicon.

11. A vibration wave actuator according to claim 9, wherein at least one of said first and second contact portions is made of iron alloy containing not less than 0.5 wt %. of aluminum.

12. A vibration wave actuator according to claim 1, wherein each of said first and second contact portions has a vicker's hardness of 600 or higher.

13. A vibration wave actuator according to claim 12, wherein both said first and second contact portions are made of iron alloys having the same composition and the same level of hardness and containing not less than 1 wt % of silicon.

14. A vibration wave actuator according to claim 12, wherein both said first and second contact portions are made of iron alloys having the same composition and the same level of hardness and containing not less than 0.5 wt % of aluminum.

15. A vibration wave actuator according to claim 1, wherein said first and second contact portions are made of materials having different compositions.

16. A vibration wave actuator according to claim 15, wherein at least one of said first and second contact portions is made of an iron alloy containing not less than 1 wt % of silicon.

17. A vibration wave actuator according to claim 15, wherein at least one of said first and second contact portions is made of iron alloy containing not less than 0.5 wt % of aluminum.

18. A vibration wave actuator according to claim 1, wherein said first and second contact portions have different levels of hardness.

19. A vibration wave actuator according to claim 18, wherein at least one of said first and second contact portions is made of an iron alloy containing not less than 1 wt % of silicon.

20. A vibration wave actuator according to claim 18, wherein at least one of said first and second contact portions is made of an iron alloy containing not less than 0.5 wt % of aluminum.

21. A vibration wave actuator according to claim 1, wherein both said first and second contact portions are made of iron alloys having the same composition and the same level of hardness and containing not less than 0.5 wt % of aluminum.

22. A vibration wave actuator according to claim 1, wherein both said first and second contact portions are made iron alloys having the same composition and the same level of hardness and containing not less than 0.5 wt % of aluminum.

23. A vibration wave actuator according to claim 8, wherein said first and second contact portions have different levels of hardness.

24. A vibration wave actuator according to claim 23, wherein at least one of said first and second contact portions is made of an iron alloy containing not less than 1 wt % of silicon.

25. A vibration wave actuator according to claim 23, wherein at least one of said first and second contact portions is made of an iron alloy containing not less than 0.5 wt % of aluminum.

26. A vibration wave actuator according to claim 8, wherein both said first and second contact portions are made of iron alloys having the same composition and the same level of hardness and containing not less than 1 wt % of silicon.

27. A vibration wave actuator according to claim 8, wherein both said first and second contact portions are made of iron alloys having the same composition and the same level of hardness and containing not less than 0.5 wt % of aluminum.

28. A system having a vibration wave actuator, said system comprising:
a vibrating member which generates a vibration wave therein, said vibration member including a first contact portion made of iron or an iron alloy and having an $Fe_3O_4$ film formed on a contact surface of the first contact portion;
a contact member which is held in contact with said vibrating member so as to be movable relative to said vibrating member by a dry friction force caused by said vibration wave, said contact member including a second contact portion made of iron or an iron alloy and having an $Fe_3O_4$ film formed on a contact surface of the second contact portion; and
a driven mechanism driven by movement of one of said vibration member and said contact member.

29. A system according to claim 28, wherein a plating film is formed on the surface of each of said first and second contact portions.

30. A system according to claim 28, wherein at least one of said first and second contact portions is made of a material containing carbon, together with at least one alloying element selected from the group consisting of chromium, molybdenum, vanadium and tungsten.

31. A system according to claim 28, wherein at least one of said first and second contact portions is made of an ausformed steel or a maraged steel.

32. A system according to claim 14, wherein each of said first and second contact portions has a vicker's hardness of 600 or higher.

33. A system according to claim 28, wherein said first and second contact portions have different levels of hardness.

34. A system according to claim 28, wherein both said first and second contact portions are made of iron alloys having the same composition and the same level of hardness and containing not less than 1 wt % of silicon.

35. A system according to claim 28, wherein both said first and second contact portions are made of iron alloys having the same composition and the same level of hardness and containing not less than 0.5 wt % of aluminum.

36. A system according to claim 28, wherein said first and second contact portions are made of materials having different compositions.

37. A system according to claim 36, wherein at least one of said first and second contact portions is made of an iron alloy containing not less than 1 wt %, of silicon.

38. A system according to claim 36, wherein at least one of said first and second contact portions is made of an iron alloy containing not less than 0.5 wt % of aluminum.

39. A vibration wave actuator, comprising:
a vibrating member which generates a vibration wave therein; and
a contact member which is held in contact with said vibrating member so as to be movable relative to said vibrating member by a dry friction force caused by said vibration wave,
wherein one of a first contact portion on said vibrating member for contacting said contact member and a second contact portion on said contact member for contacting said vibration member is made of iron or an iron alloy and has an $Fe_3O_4$ film formed on a contact surface thereof, and the other one of said first contact portion and said second contact portion is made of a ceramic or cermet composite material.

40. A vibration wave actuator according to claim 39, wherein said iron or iron alloy is a stainless steel.

41. A vibration wave actuator according to claim 39, wherein said iron or iron alloy has a vicker's hardness of 600 or higher.

42. A vibration wave actuator according to claim 39, wherein said iron alloy contains not less than 1 wt % of silicon.

43. A vibration wave actuator according to claim 39, wherein said iron alloy contains not less than 0.5 wt % of aluminum.

44. A system having a vibration wave actuator, comprising:
a vibrating member which generates a vibration wave therein;
a contact member which is held in contact with said vibrating member so as to be movable relative to said vibrating member by a dry friction force caused by said vibration wave; and
a driven mechanism driven by movement of one of said vibrating member and said contact member, wherein one of a first contact portion on said vibrating member for contacting said contact member and a second contact portion on said contact member for contacting said vibrating member is made of iron or an iron alloy and has an $Fe_3O_4$ film formed on a contact surface thereof, and the other one of said first contact portion and said second contact portion is made of a ceramic or cermet composite material.

45. A system according to claim 44, wherein said iron or iron alloy is a stainless steel.

46. A system according co claim 44, wherein said iron or iron alloy has a vicker's hardness of 600 or higher.

47. A system according to claim 44, wherein said iron alloy contains not less than 1 wt % of silicon.

48. A system according to claim 44, wherein said iron alloy contains not less than 0.5 wt % of aluminum.

* * * * *

UNITED STATES PATENT AND TRADEMARK OFFICE
CERTIFICATE OF CORRECTION

PATENT NO. : 5,760,529　　　　　　　　　　　Page 1 of 7
DATED : June 2, 1998
INVENTOR(S) : JUN TAMAI, ET AL.

It is certified that error appears in the above-identified patent and that said Letters Patent is hereby corrected as shown below:

COLUMN 2

Line 46, Close up right margin.
　　　Line 47, Close up left margin.

COLUMN 3

Line 29, "view point" should read --viewpoint--.
　　　Line 39, "surfaces" should read --surfaces.--

COLUMN 4

Line 11, Close up right margin.
　　　Line 12, Close up left margin.
　　　Line 28, "show" should read --shown--.
　　　Line 60, Close up right margin.
　　　Line 61, Close up left margin.

UNITED STATES PATENT AND TRADEMARK OFFICE
CERTIFICATE OF CORRECTION

PATENT NO. : 5,760,529
DATED : June 2, 1998
INVENTOR(S) : JUN TAMAI, ET AL.

It is certified that error appears in the above-identified patent and that said Letters Patent is hereby corrected as shown below:

COLUMN 5

Table 1

In "Sample No. 9" under column heading "Structure", "Nicrided" should read --Nitrided--, and under column heading "Remarks", "Nicrided" should read --Nitrided--;
In "Sample No. 17" under column heading "Structure", "Martensite +" should read --Martensite + Carbide-- and under column heading "Surface Hardness", "Carbide 700" should read --700--.
In "Sample No. 18" under column heading "Structure", "Martensite +" should read --Martensite + Carbide-- and under column heading "Surface Hardness", "Carbide 800" should read --800--; and
In "Sample No. 21", under column heading "Structure", "Martensite +" should read --Martensite + Carbide--; and under column heading "Surface Hardness (Vicker's)", "Carbide 760" should read --760--.

COLUMN 9

Line 29, "hardness" should read --hardness.--
Line 55, "Lo" should read --to--.

UNITED STATES PATENT AND TRADEMARK OFFICE
CERTIFICATE OF CORRECTION

PATENT NO. : 5,760,529　　　　　　　　　　　　Page 3 of 7
DATED : June 2, 1998
INVENTOR(S) : JUN TAMAI, ET AL.

It is certified that error appears in the above-identified patent and that said Letters Patent is hereby corrected as shown below:

COLUMN 10

Line 11, "view" should read --view- --.
    Line 13, "Lest" should read --test--.
    Line 18, "Lest," should read --test,--.
    Line 58, "Lo" should read --to--.

COLUMN 11

Line 8, "nor" should read --not--.
    Line 14, "sick" should read --stick--.
    Line 48, "members" should read --members.--
    Line 60, "detail" should read --details--.

COLUMN 12

Line 41, "exhibits" should read --exhibited--.
    Line 42, "tho" should read --the--.
    Line 63, "view point" should read --viewpoint--.

COLUMN 13

Line 13, "materials" should read --materials.--.

UNITED STATES PATENT AND TRADEMARK OFFICE
CERTIFICATE OF CORRECTION

PATENT NO. : 5,760,529
DATED : June 2, 1998
INVENTOR(S) : JUN TAMAI, ET AL.

It is certified that error appears in the above-identified patent and that said Letters Patent is hereby corrected as shown below:

Column 15

Table 4

TABLE 4

| Sample No. | Material | Composition (wt %) | JIS | Processing Method | Treatment | Structure | Surface Hardness (Vickers) | Remarks |
|---|---|---|---|---|---|---|---|---|
| 31 | Iron or Carbon steel | C 0.45% | S45C | Cutting | Quench/Tempering | Martensite | 720 | Tempering 200°C | should read

TABLE 4

| Sample No. | Material | | Composition (wt %) | JIS | Processing Method | Treatment | Structure | Surface Hardness (Vickers) | Remarks |
|---|---|---|---|---|---|---|---|---|---|
| 31 | Iron or | Carbon steel | C 0.45% | S45C | Cutting | Quench/Tempering | Martensite | 720 | Tempering 200°C |

(More specifically, the column "Material" should cover the first two columns of text in the table, moving the subsequent headings to the right by one column.)

UNITED STATES PATENT AND TRADEMARK OFFICE
CERTIFICATE OF CORRECTION

PATENT NO. : 5,760,529

DATED : June 2, 1998

INVENTOR(S) : JUN TAMAI, ET AL.

Page 5 of 7

It is certified that error appears in the above-identified patent and that said Letters Patent is hereby corrected as shown below:

COLUMN 17

Table 5,

Heading of fifth column,
"Fricition" should read --Friction--.

Line 57, Close up right margin.
Line 58, Close up left margin.
Line 61, Close up right margin.
Line 62, Close up left margin.

COLUMN 18

Line 44, "2x10$^-$" should read --2x10$^{-3}$N·m.--
Line 45, "3N·m." should be deleted.
Line 51, "Insofaras" should read --Insofar as--.
Line 67, Close up right margin.

COLUMN 19

Line 1, Close up left margin.

COLUMN 20

Line 43, Close up right margin.

Table 6,

Heading for fifth column,

"Fricition" should read --Friction--.

UNITED STATES PATENT AND TRADEMARK OFFICE
CERTIFICATE OF CORRECTION

PATENT NO. : 5,760,529
DATED : June 2, 1998
INVENTOR(S) : JUN TAMAI, ET AL.

It is certified that error appears in the above-identified patent and that said Letters Patent is hereby corrected as shown below:

COLUMN 21

Line 60, "contains also" should read --also contains--.

COLUMN 23

Table 7,

Heading for fifth column,

"Fricition" should read --Friction--.

Line 49, close up right margin.
Line 50, close up left margin.
Line 52, "$Fe_2O_4$" should read --$Fe_3O_4$--.

COLUMN 24

Line 50, "vicker's" should read --Vicker's--.

COLUMN 25

Line 18, "0.5 wt %" should read --1 wt. %--.
Line 19, "aluminum." should read --silicon.--
Line 21, "made" should read --made of--.

UNITED STATES PATENT AND TRADEMARK OFFICE
CERTIFICATE OF CORRECTION

PATENT NO. : 5,760,529
DATED : June 2, 1998
INVENTOR(S) : JUN TAMAI, ET AL.

It is certified that error appears in the above-identified patent and that said Letters Patent is hereby corrected as shown below:

COLUMN 26

Line 7, "claim 14," should read --claim 28,--.
Line 8, "vicker's" should read --Vicker's--.
Line 25, "1 wt %," should read --1 wt% --.
Line 47, "vicker's" should read --Vicker's--.
Line 65, "member, wherein" should read --member, ¶ wherein--.

COLUMN 28

Line 2, "vicker's" should read --Vicker's--.

Signed and Sealed this

Fourth Day of May, 1999

Q. TODD DICKINSON

Attest:

Attesting Officer

Acting Commissioner of Patents and Trademarks